United States Patent
von Helmolt et al.

(10) Patent No.: US 7,693,594 B2
(45) Date of Patent: Apr. 6, 2010

(54) SYSTEM AND METHOD FOR SCHEDULING DRIVEN AVAILABILITY CHECK

(75) Inventors: Hans-Ulrich A. von Helmolt, Heidelberg (DE); Thomas A. Mayer, Leimen (DE); Carsten Kreuels, Contwig (DE)

(73) Assignee: SAP AG, Walldorf (DE)

( * ) Notice: Subject to any disclaimer, the term of this patent is extended or adjusted under 35 U.S.C. 154(b) by 22 days.

(21) Appl. No.: 11/323,424

(22) Filed: Dec. 29, 2005

(65) Prior Publication Data

US 2007/0156273 A1  Jul. 5, 2007

(51) Int. Cl.
*G06F 19/00* (2006.01)
(52) U.S. Cl. .................... 700/100; 700/99; 700/106
(58) Field of Classification Search ............. 700/95, 700/99, 100, 106, 97; 705/7–9, 22, 28, 29, 705/1, 26
See application file for complete search history.

(56) References Cited

U.S. PATENT DOCUMENTS

| 5,065,392 | A | * | 11/1991 | Sibbitt et al. ............... 370/360 |
| 5,065,393 | A | * | 11/1991 | Sibbitt et al. ............... 370/360 |
| 5,787,000 | A | * | 7/1998 | Lilly et al. .................... 700/95 |
| 5,892,535 | A | * | 4/1999 | Allen et al. ................... 725/36 |
| 5,893,906 | A | * | 4/1999 | Daffin et al. ................. 705/28 |
| 5,948,040 | A | * | 9/1999 | DeLorme et al. ........... 701/201 |
| 6,088,626 | A | * | 7/2000 | Lilly et al. .................. 700/100 |
| 6,389,454 | B1 | * | 5/2002 | Ralston et al. ................ 705/8 |
| 6,735,293 | B2 | * | 5/2004 | Doherty et al. ......... 379/201.12 |
| 6,801,820 | B1 | * | 10/2004 | Lilly et al. .................. 700/100 |
| 6,941,514 | B2 | * | 9/2005 | Bradford ....................... 705/8 |
| 6,961,415 | B2 | * | 11/2005 | Doherty et al. ......... 379/201.12 |
| 7,089,071 | B2 | * | 8/2006 | Lilly et al. .................. 700/100 |
| 7,280,881 | B2 | * | 10/2007 | Eller et al. .................. 700/100 |
| 2002/0072986 | A1 | * | 6/2002 | Aram .......................... 705/26 |
| 2002/0095307 | A1 | * | 7/2002 | Greamo et al. ................ 705/1 |
| 2002/0111842 | A1 | * | 8/2002 | Miles ........................... 705/8 |
| 2005/0055252 | A1 | * | 3/2005 | Todd ............................ 705/5 |

* cited by examiner

*Primary Examiner*—Charles R Kasenge
(74) *Attorney, Agent, or Firm*—Schwegman, Lundberg & Woessner, P.A.

(57) ABSTRACT

In an embodiment, a scheduling process and an availability process are provided in which both the scheduling process and the availability process reside in a service architecture. The scheduling process is configurable to invoke the availability process at a point in the scheduling process, and a user of the service architecture may configure the scheduling process.

18 Claims, 4 Drawing Sheets

SYSTEM AND METHOD FOR SCHEDULING DRIVEN AVAILABILITY CHECK

BACKGROUND

The vast majority of business organizations now, regardless of their size, use computer-aided systems to run their business processes. An example of such a system is a customer ordering system, wherein a customer can place an order for a good or material, and the business owner will process that order and provide the goods to the customer. When using such an ordering system, the customer may want to know if the merchandise will be available on a certain date. The system may determine/confirm this by performing an availability check. Such systems which perform an availability check may check for the availability of a material on a certain date, or whether the shipping essentials such as trucks will be available on a certain date. The point in time when the availability check is triggered, and/or the dates that are used for the availability check, are normally hard-coded into the business's ordering system. However, this causes problems because different business organizations and/or processes perform the availability checks at different points in the process and may use different dates. For example, a business process may need a particular material five days before a delivery date can be promised, whereas another business process may require the material 10 days prior to delivery. Similarly, one business process may need to check the availability date of the material within an internal plant, whereas a second business process may require checking the delivery date with regard to a specific customer or sales region quotation. Also, the critical link for one business process may be early on in the supply chain, while for another business process it may be later on in the supply chain. This causes problems for a large organization that may have multiple processes within the organization, and hence multiple order applications, or a software vendor who has to service many different clients with many different business processes. The art is therefore in need of a different process that can more flexibly handle such business processes.

SUMMARY

In an embodiment, a scheduling process and an availability process are provided in which both the scheduling process and the availability process reside in a service architecture. The scheduling process is configurable to invoke the availability process at a point in the scheduling process, and a user of the service architecture may configure the scheduling process.

DETAILED DESCRIPTION

Figure 1:
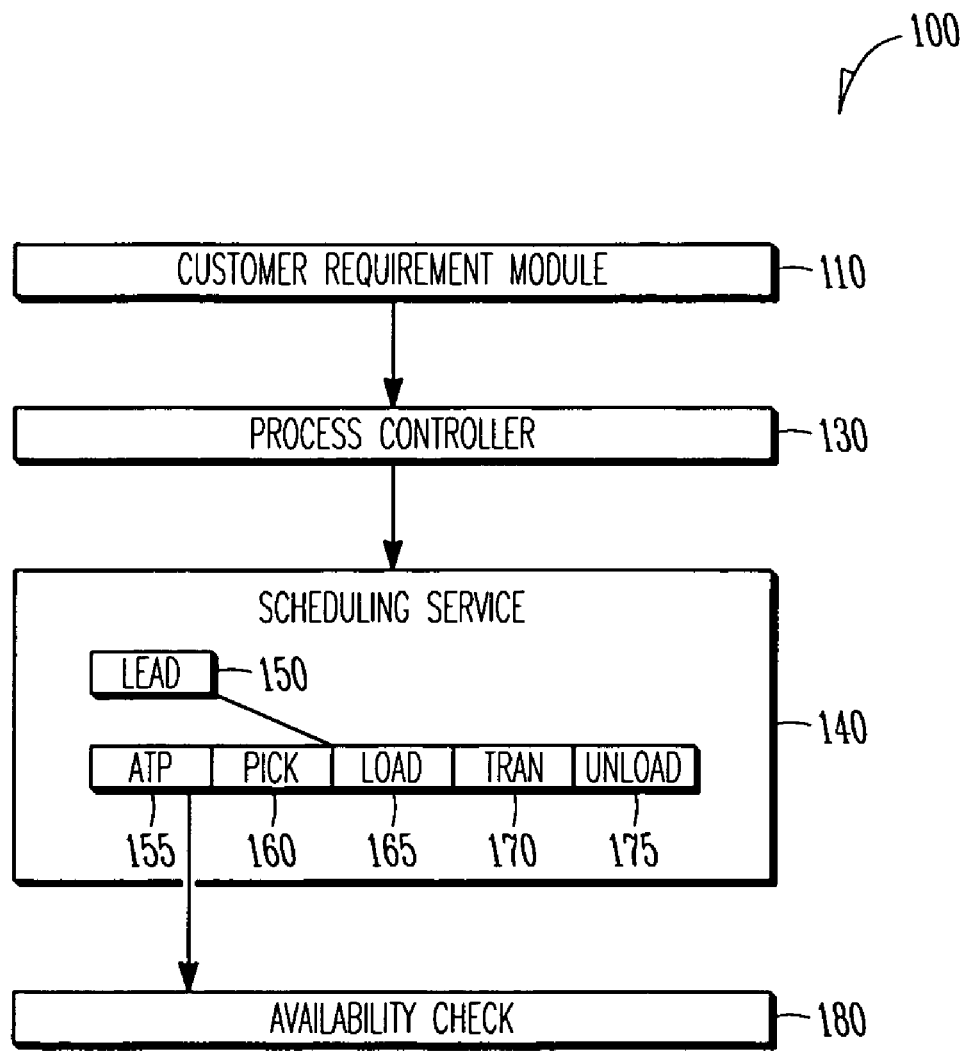
FIG. 1 illustrates an example embodiment of a service architecture that may be used in connection with one or more embodiments of the invention.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

The functions or algorithms described herein are implemented in software or a combination of software and human implemented procedures in one embodiment. The software comprises computer executable instructions stored on computer readable media such as memory or other type of storage devices. Further, such functions correspond to modules, which are software, hardware, firmware or any combination thereof. Multiple functions are performed in one or more modules as desired, and the embodiments described are merely examples. The software is executed on a digital signal processor, ASIC, microprocessor, or other type of processor operating on a computer system, such as a personal computer, server or other computer system.

In many business processes, a customer orders a good or product and is interested in, among other things, when that product may be delivered to the customer. Such a delivery date may first of all depend on whether the business from which the goods are ordered must procure those goods (as a distributor would), must manufacture those goods (as a manufacturer would), or whether those goods are presently in the business's stock (whether procured by the business or manufactured by the business). Then, different dates will need to be calculated based on the good ordered and the business from which it is ordered. That is, if the business is a manufacturer, the delivery date will depend to some extent on the date that the raw materials will be available. If the business is a distributor, then the delivery date will depend in part on the availability of transportation facilities.

An embodiment of the invention addresses the above-identified issues through the use of a scheduling process having flexible configuration capabilities. Such an embodiment integrates item and scheduling oriented services (like an availability check) into the scheduling process so the scheduling process can control these processes. Since a scheduling process is highly configurable, in one or more embodiments it is possible to easily change the point in time when different availability checks (or other services) are triggered and the entry dates for these checks.

In another embodiment, the scheduler manages an activity network wherein each activity has a start date, an end date, and a duration. The scheduler processes the activity network activity by activity, and it calculates start and/or end dates for each of the activities. In an embodiment, the scheduling process delegates the date calculation to other components. In such situations, the end date of one activity is the start date of the next activity in a forward scheduling environment, and the start date of one activity is the end date of a previous activity in a backward scheduling environment. For example, when ordering a manufactured good, the business organization may look at the end of the business process chain to see when shipping is available for the final product and work backwards from that to starting materials availability. On the other hand, the business organization may first look to when the starting materials are available, and work forward to a finished product and delivery date. The scheduler is capable of either.

FIG. 1 illustrates in block form a service architecture 100 that may be used in connection with a scheduling driven availability check. In an embodiment, the service architecture 100 is a customer order system. A customer requirements module 110 determines the processing requirements of a customer such as the date that a customer needs his or her order filled. The data from the customer requirements module 110 is provided to a process controller 130. The process controller controls the process of fulfilling the customer requirements, the different process steps that are needed, and the scheduling process model. The process controller 130 is coupled to a scheduling process 140. In an embodiment, the scheduling process includes an activity network that includes one or more activities. The one or more activities in the activity network include a start date, an end date, and a duration. In the embodiment of FIG. 1, the scheduling process 140 includes a lead time activity 150, an available to promise (ATP) activity 155, a pickup activity 160, a loading activity 165, a transportation activity 170, and an unloading activity 175. The ATP activity can be inserted anywhere in the activity network. It should be noted that the activities of the scheduling process 140 in FIG. 1 are just an example, and the scheduling process may be configured to handle many different customer order requirements as provided by the customer order requirements module 110. It should further be noted that the customer himself may configure the customer requirements module. The scheduling process 140 is configured in such a way that the ATP activity delegates the calculation of the start/end dates of the activity to an availability process component 180. That way the ATP activity invokes the availability process 180, and the availability process 180 sends back to the scheduling process 140 one or more availability dates. The system can be configured with the dates that are supplied with the call to the ATP activity. In an embodiment, the dates supplied to the ATP activity depend on the previous scheduling steps which define the input date for the ATP activity. In another embodiment, a scheduling network may be modeled with more than one ATP activity, in which each ATP activity is delegated to a different availability check method.

Figure 2:
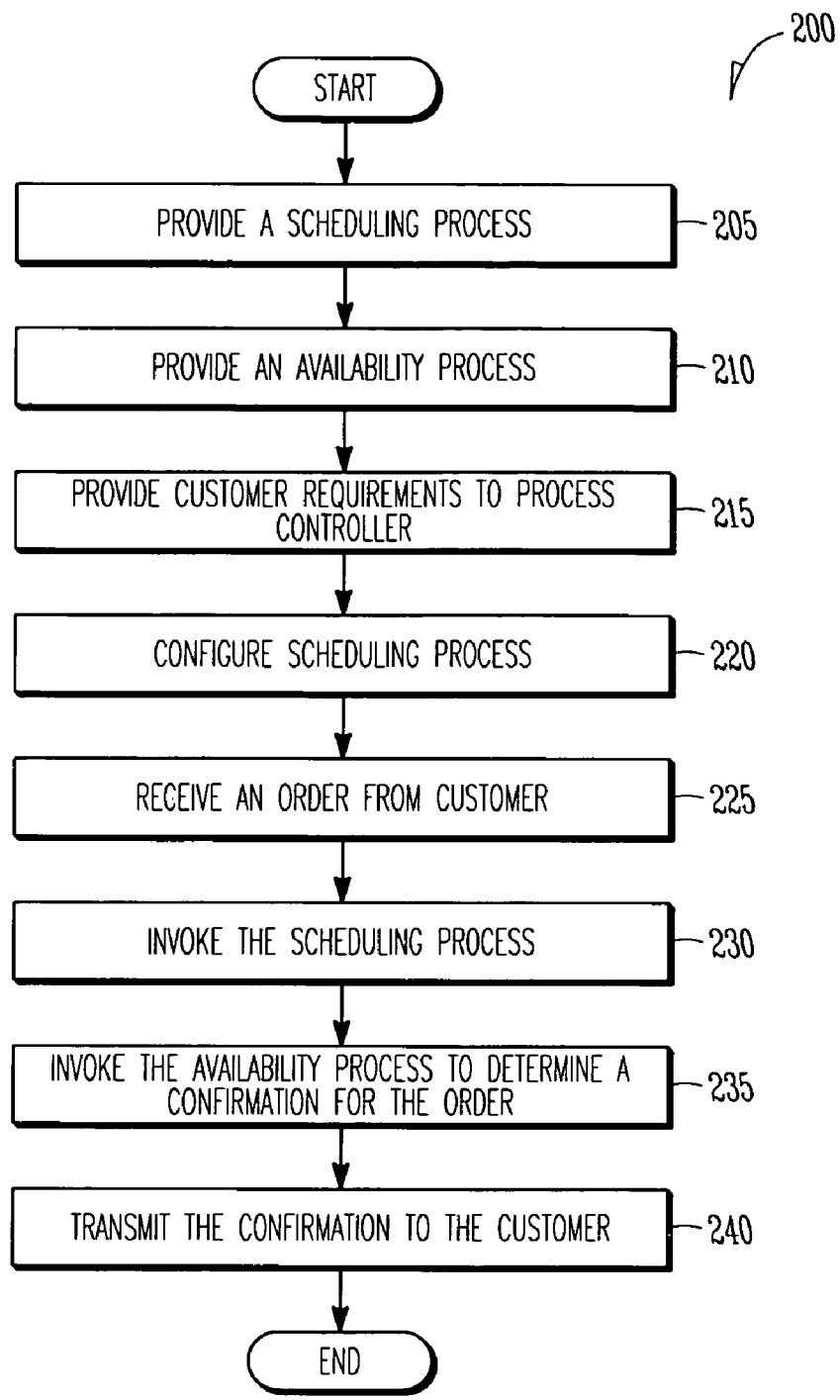
FIG. 2 illustrates an example embodiment of a process to configure and implement a customer ordering system.

FIG. 2 illustrates a process 200 in which a scheduling process and an availability process execute a customer order. First, a scheduling process and an availability process are provided at operations 205 and 210 respectively. Customer requirements are provided to the process controller at operation 215. At operation 220, the scheduling process is configured to invoke the availability process at one or more points in the scheduling process. The availability check can be regarded as a special scheduling step, calculating from a requested availability date a confirmed availability date. The scheduling service just executes the process model activity by activity, and delegates the calculation if a delegation class is provided. The confirmation consists generally of confirmed quantities and confirmed material availability dates. The scheduling service then calculates confirmed delivery dates out of the material availability dates. The number of times that the scheduling process invokes the availability process, and the precise points in the scheduling process from which the availability process is invoked, is determined at least in part by the customer requirements module. In at least one embodiment, a user of the service architecture, as contrasted with the developer of the architecture, is able to configure the scheduling process to suit the user's needs. Such a user may be an independent software vendor, and that vendor may link to the process controller to configure the system.

In an embodiment, the scheduling process is configurable so as to determine the data that is sent to the availability process by the scheduling process. In a particular embodiment, the scheduling process is configurable to pass a requested availability date to the availability process, and the availability process is in turn configurable to pass back to the scheduling process one or more confirmed availability dates.

FIG. 2 further illustrates the operations of the service architecture 100 when it serves as a customer order system and it processes a customer order. At operation 225, the system 100 receives an order from a customer. This causes the invocation of the scheduling process at operation 230. The scheduling process in turn invokes the availability process. The availability process determines a confirmation date or dates for an order at operation 235, and then, at operation 240 passes the confirmation information back to the customer.

Figure 3:
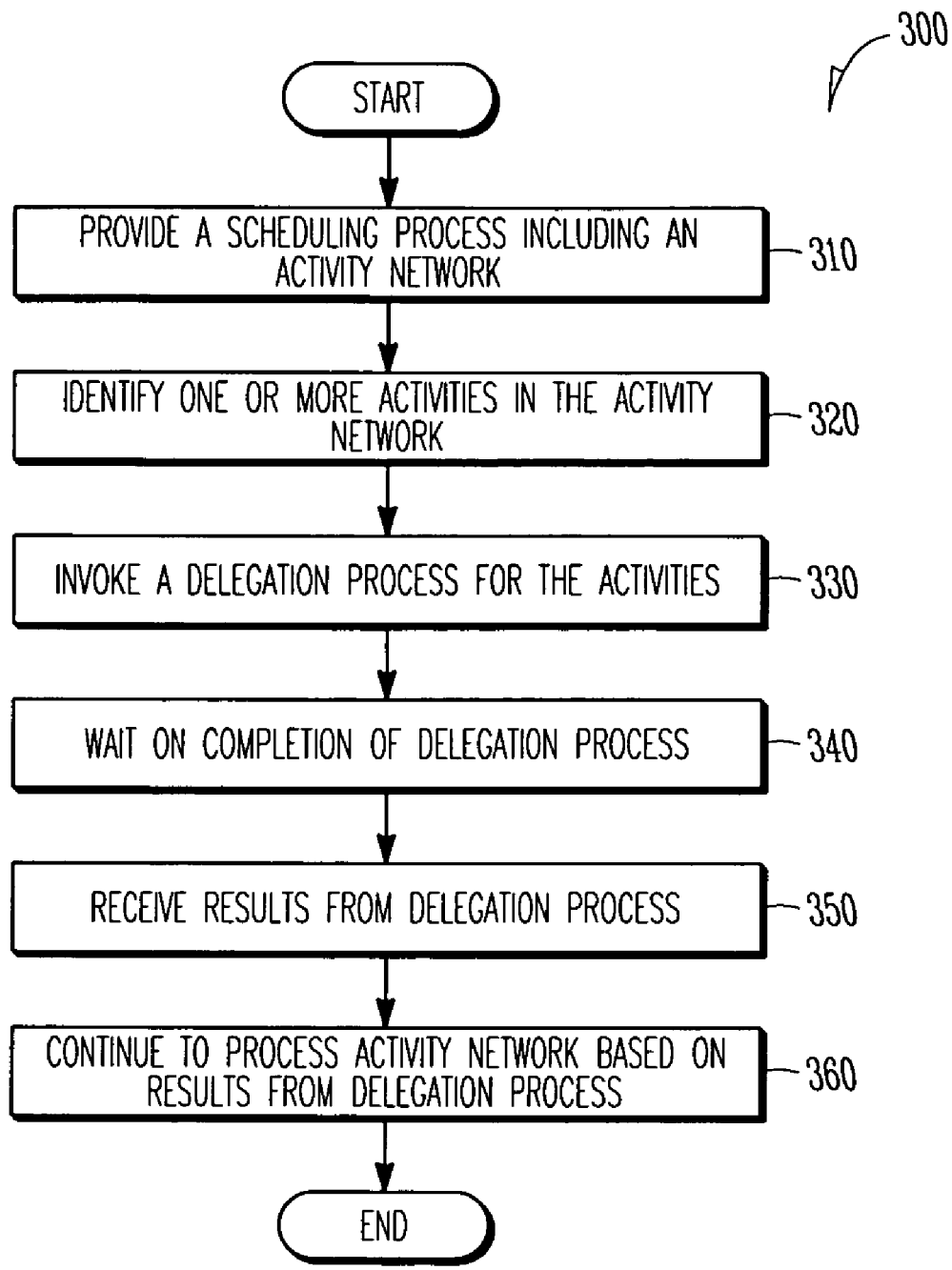
FIG. 3 illustrates another example embodiment of a process to implement a scheduling service.

FIG. 3 illustrates an embodiment of a process used in connection with the operations of the service architecture 100 when a scheduling process is provided with an activity network at operation 310. At operation 320, one or more activities are identified in the activity network. A delegation process for these activities is invoked at operation 330. The system goes into a wait state at operation 340, waiting for the completion of the delegation process. The process scheduler retrieves the results from the delegation process at operation 350, and the process scheduler at operation 360 continues to process the activity network based on the results received from the delegation process.

In an embodiment, the service architecture is configured to allow insertion of an invocation of the availability process into a particular place in the activity network, and it is further configurable as to data with which the availability process is invoked.

Figure 4:
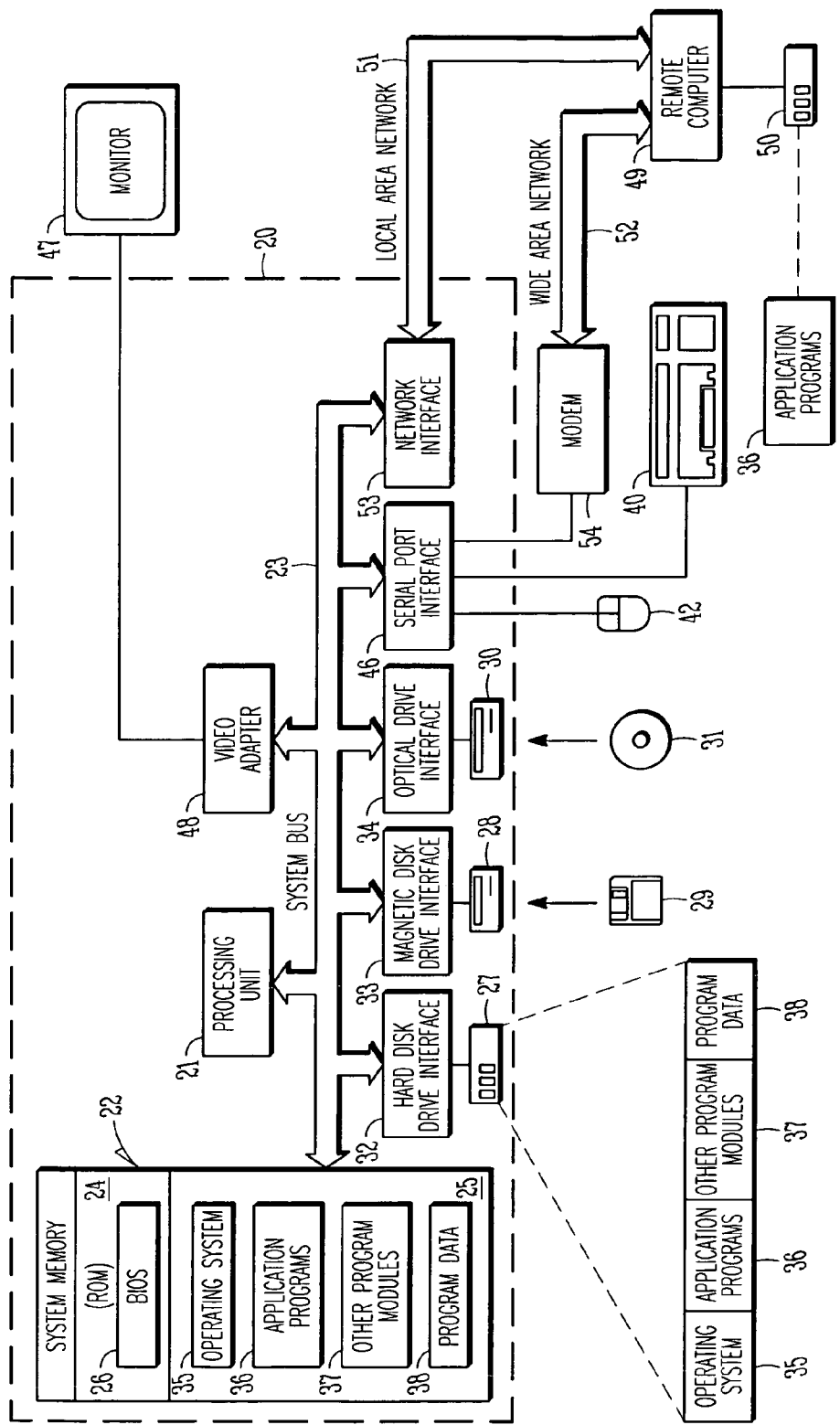
FIG. 4 illustrates an example embodiment of a computer architecture upon which one or more embodiments of the invention may execute.

FIG. 4 is an overview diagram of a hardware and operating environment in conjunction with which embodiments of the invention may be practiced. The description of FIG. 4 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 4, a hardware and operating environment is provided that is applicable to any of the servers and/or remote clients shown in the other Figures.

As shown in FIG. 4, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 4 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A process comprising:
   providing to a computer processor a scheduling process; and
   providing to the computer processor an availability process;
   wherein the scheduling process and the availability process reside in a service architecture;
   wherein the scheduling process is configurable to invoke the availability process at a point in the scheduling process;
   wherein a user of the service architecture may configure the scheduling process, by altering a customer requirements module, to change the number of times that the scheduling process invokes the availability process and to change one or more points in time in the scheduling process from which the availability process is invoked;
   wherein the customer requirements module determines the processing requirements of a customer order;
   wherein the scheduling process includes an activity network that includes one or more activities; and
   wherein the activities include a lead time activity, an available to promise (ATP) activity, a pickup activity, a loading activity, a transportation activity, and an unloading activity.

2. The process of claim 1, wherein the scheduling process is further configurable so as to determine data that is passed to the availability process.

3. The process of claim 1, wherein
   the scheduling process is configurable to pass a requested availability date to the availability process; and
   the availability process is configurable to pass back to the scheduling process one or more confirmed availability dates.

4. The process of claim 1, wherein the service architecture comprises a customer order system.

5. The process of claim 4, wherein the service architecture is configurable to:
   receive an order from a customer;
   invoke the scheduling process;
   invoke the availability process, wherein the availability process determines a confirmation for an order; and
   pass the confirmation back to the customer.

6. The process of claim 1, wherein the scheduling process is further configured to:
   identify one or more activities in the activity network;
   invoke a delegation process for these activities;
   wait until the completion of the delegation process;
   retrieve a result from the delegation process; and
   continue to process the activity network based on the result from the delegation process.

7. The process of claim 1, wherein the service architecture is configured to allow insertion of an invocation of the availability process into a particular place in the activity network, and further wherein the computer processor is configurable so as to determine data with which the availability process is invoked.

8. A system comprising:
   a computer processor configured to provide a scheduling process; and
   the computer processor configured to provide an availability process;
   wherein the scheduling process and the availability process reside in a service architecture;
   wherein the scheduling process is configurable to invoke the availability process at a point in the scheduling process;
   wherein a user of the service architecture may configure the scheduling process, by altering a customer requirements module, to change the number of times that the scheduling process invokes the availability process and to change one or more points in time in the scheduling process from which the availability process is invoked;
   wherein the customer requirements module determines the processing requirements of a customer order;
   wherein the scheduling process includes an activity network that includes one or more activities; and
   wherein the activities include a lead time activity, an available to promise (ATP) activity, a pickup activity, a loading activity, a transportation activity, and an unloading activity.

9. The system of claim 8, wherein the scheduling process is further configurable so as to determine data that is passed to the availability process.

10. The system of claim 8, wherein
    the scheduling process is configurable to pass a requested availability date to the availability process; and
    the availability process is configurable to pass back to the scheduling process one or more confirmed availability dates.

11. The system of claim 8, wherein the service architecture comprises a customer order system.

12. The system of claim 11, wherein the service architecture is configurable to:
    receive an order from a customer;
    invoke the scheduling process;
    invoke the availability process, wherein the availability process determines a confirmation for an order; and
    pass the confirmation back to the customer.

13. The system of claim 8, wherein the scheduling process is further configured to:
    identify one or more activities in the activity network;
    invoke a delegation process for these activities;
    wait until the completion of the delegation process;
    retrieve a result from the delegation process; and
    continue to process the activity network based on the result from the delegation process.

14. The system of claim 8, wherein the service architecture is configured to allow insertion of an invocation of the availability process into a particular place in the activity network, and further wherein the computer processor is configurable so as to determine data with which the availability process is invoked.

15. A computer-readable medium with instructions thereon for executing a process comprising:
    providing to a computer processor a scheduling process; and
    providing to the computer processor an availability process;
    wherein the scheduling process and the availability process reside in a service architecture;
    wherein the scheduling process is configurable to invoke the availability process at a point in the scheduling process;
    wherein a user of the service architecture may configure the scheduling process, by altering a customer requirements module, to change the number of times that the scheduling process invokes the availability process and to change one or more points in time in the scheduling process from which the availability process is invoked;
    wherein the customer requirements module determines the processing requirements of a customer order;
    wherein the scheduling process includes an activity network that includes one or more activities; and
    wherein the activities include a lead time activity, an available to promise (ATP) activity, a pickup activity, a loading activity, a transportation activity, and an unloading activity.

16. The computer-readable medium of claim 15, wherein
    the scheduling process is further configurable so as to determine data that is passed to the availability process;
    the scheduling process is configurable to pass a requested availability date to the availability process;
    the availability process is configurable to pass back to the scheduling process one or more confirmed availability dates; and
    the service architecture comprises a customer order system.

17. The computer-readable medium of claim 16, wherein the service architecture is configurable to:
    receive an order from a customer;
    invoke the scheduling process;
    invoke the availability process, wherein the availability process determines a confirmation for an order; and
    pass the confirmation back to the customer.

18. The computer-readable medium of claim 17, wherein the scheduling process is further configured to:
    identify one or more activities in the activity network;
    invoke a delegation process for these activities;
    wait until the completion of the delegation process;
    retrieve a result from the delegation process; and
    continue to process the activity network based on the result from the delegation process; and
    wherein the service architecture is configured to allow insertion of an invocation of the availability process into a particular place in the activity network, and further wherein the computer process is configurable so as to determine data with which the availability process is invoked.

* * * * *